US006937845B2

(12) United States Patent
Watanabe et al.

(10) Patent No.: US 6,937,845 B2
(45) Date of Patent: Aug. 30, 2005

(54) HIGH-FREQUENCY MODULE AND RADIO DEVICE USING THE SAME

(75) Inventors: Takahiro Watanabe, Shiga-ken (JP); Norio Yoshida, Otsu (JP); Tomonori Ito, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 486 days.

(21) Appl. No.: 09/824,361

(22) Filed: Apr. 2, 2001

(65) Prior Publication Data

US 2002/0034934 A1 Mar. 21, 2002

(30) Foreign Application Priority Data

Mar. 31, 2000 (JP) ....................................... 2000-098847
May 16, 2000 (JP) ....................................... 2000-143371

(51) Int. Cl.[7] .............................. H04B 1/44; H04B 1/46
(52) U.S. Cl. .............................. 455/83; 455/82; 455/78
(58) Field of Search ................................ 327/524, 551; 333/176, 126, 101, 124, 132; 455/83, 82, 78, 80, 120, 121, 269; 375/324

(56) References Cited

U.S. PATENT DOCUMENTS 4,989,230 A * 1/1991 Gillig et al. ............. 455/552.1
5,697,088 A 12/1997 Gu
5,862,466 A * 1/1999 Erickson ..................... 455/321
5,999,065 A * 12/1999 Furutani et al. ............ 333/103
6,100,776 A * 8/2000 Furutani et al. ............ 333/136
6,147,571 A * 11/2000 Kitazawa et al. ........... 333/126
6,351,502 B1 * 2/2002 Zargari ....................... 375/324
6,366,564 B1 * 4/2002 Hiraka et al. ............... 370/275
6,496,083 B1 * 12/2002 Kushitani et al. ........... 333/103
6,633,748 B1 * 10/2003 Watanabe et al. ............. 455/78
6,658,263 B1 * 12/2003 Ke et al. ..................... 455/524
2002/0127973 A1 * 9/2002 Furutani et al. .............. 455/82

FOREIGN PATENT DOCUMENTS

EP 704 925 9/1995
JP 58-069106 4/1983
JP 08-097743 4/1996
JP 09-200077 7/1997
JP 11-261398 9/1999
WO WO 00/72457 A1 11/2000

OTHER PUBLICATIONS

Jacob Rael et al.: "Design Methodology used in a Single–Chip CMOS 900 MHz Spread–Spectrum Wireless Transceiver"; Design Automation Conference, 1998. Proceedings; San Francisco, CA, USA Jun. 15–19, 1998; pp. 44–49.

Huainan Ma et al.: "A Single–chip 1.9 GHz RF Transceiver MMIC using GaAs MESFET Technology"; Radio Frequency Integrated Circuits (RFIC) Symposium, 1998 IEEE Baltimore, MD, USA Jun. 7–9, 1998; pp. 101–104.

Shimon Krausz: "New Configuration for T/R Switches Used in RF Transmitters"; 27th European Microwave Conference Proceedings; Jerusalem, Sep. 8–12, 1997; Proceedings of the European Microwave Conference, Jerusalem; pp. 1169–1174.

English translation of Office Action from French Patent Office dated Mar. 30, 2001.

English translation of Office Action from German patent office dated Sep. 16, 2002.

* cited by examiner

*Primary Examiner*—Vivian Chin
*Assistant Examiner*—Raymond B. Persino
(74) *Attorney, Agent, or Firm*—Keating & Bennett, LLP

(57) ABSTRACT

A high-frequency module includes first to fifth terminals, a high-pass filter, a high-frequency switch, a transmitter-side balun, and a receiver-side balun. The high-pass filter is connected to the high-frequency switch, and the high-frequency switch is also connected to the transmitter-side balun and to the receiver-side balun. The first terminal is connected to an antenna, the second and third terminals are connected to a transmitter circuit, and the fourth and fifth terminals are connected to a receiver circuit.

15 Claims, 8 Drawing Sheets

HIGH-FREQUENCY MODULE AND RADIO DEVICE USING THE SAME

BACKGROUND OF THE INVENTION

1. Field of the Invention

The present invention generally relates to a high-frequency module and a radio device including the same, and more particularly, to a high-frequency module for use in a balanced transmitter/receiver system, and to a radio device including the same.

2. Description of the Related Art

In general, the 2.4 GHz band is an Industrial, Scientific and Medical (ISM) equipment frequency band, and is internationally allocated for industrial, scientific and medical use so as to prevent disturbances due to crosstalk or interference. The 2.4 GHz is utilized for wireless local area networks (LANs) because it ensures the bandwidth in which high-speed broadband communications of several megabits per second (Mbps) are possible, or because it has high availability and high radio-wave propagation at low cost.

FIG. 13 is a block diagram showing a radio frequency (RF) circuit for Bluetooth, a wireless LAN protocol, which was suggested in "NIKKEI ELECTRONICS" No. 761, p. 155, published by Nikkei Business Publications, Inc. The RF circuit includes a band-pass filter 51, a high-frequency switch 52 for switching a transmission signal and a reception signal, a transmitter circuit Tx having a high-power amplifier 53 and a multiplier 54, and a receiver circuit Rx having a low-noise amplifier 55 and a mixer 56. The band-pass filter 51 attenuates spurious high-frequency signals such as transmission and reception signals of other frequency band communication systems represented by GSM (Global System for Mobile communication) in the 900 MHz band, DCS (Digital Cellular System) in the 1.8 GHz band, and PCS (personal Communication Services) in the 1.9 GHz band, and the second and third harmonics of reception signals of the 2.4 GHz band communication system of the present invention. The band-pass filter 51 has a first terminal 511 connected to an antenna ANT, and a second terminal 512 connected to a first terminal 521 of the high-frequency switch 52. A second terminal 522 and a third terminal 523 of the high-frequency switch 52 are connected to the high-power amplifier 53 in the transmitter circuit Tx, and the low-noise amplifier 55 in the receiver circuit Rx, respectively.

In the above-described RF circuit, the band-pass filter is used as a high-frequency filter for attenuating spurious high-frequency signals such as transmission and reception signals of other frequency band communication systems, and the second and third harmonics of reception signals of the communication system of the present invention. Such a typical RF circuit experiences problems with the insertion loss at the high-frequency filter being reduced, thus reducing the insertion loss at a high-frequency module.

SUMMARY OF THE INVENTION

In order to overcome the problems described above, preferred embodiments of the present invention provide a compact high-frequency module that prevents reduction in the insertion loss, and a radio device including such a novel high-frequency module.

According to a preferred embodiment of the present invention, a high-frequency module includes a high-frequency filter for attenuating a spurious high-frequency signal, a high-frequency switch for switching a transmission signal and a reception signal, a transmitter-side balun for converting a balanced signal into an unbalanced signal, and a receiver-side balun for converting an unbalanced signal into a balanced signal. The high-frequency filter is disposed between an antenna and a first terminal of the high-frequency switch, and second and third terminals of the high-frequency switch are connected to an unbalanced terminal of the transmitter-side balun, and an unbalanced terminal of the receiver-side balun, respectively. Preferably, the high-frequency filter is a high-pass filter.

In another preferred embodiment of the present invention, a high-frequency module includes a high-frequency filter for attenuating a spurious high-frequency signal, a high-frequency switch for switching a transmission signal and a reception signal, a transmitter-side balun for converting a balanced signal into an unbalanced signal, and a receiver-side balun for converting an unbalanced signal into a balanced signal. The high-frequency filter is disposed between an antenna and a first terminal of the high-frequency switch, and second and third terminals of the high-frequency switch are connected to an unbalanced terminal of the transmitter-side balun, and an unbalanced terminal of the receiver-side balun, respectively. Preferably, the high-frequency filter is a notch filter.

Another preferred embodiment of the present invention is a high-frequency module including a high-pass filter or a notch filter for attenuating a spurious high-frequency signal, a high-frequency switch for switching a transmission signal and a reception signal, a transmitter-side balun for converting a balanced signal into an unbalanced signal, and a receiver-side balun for converting an unbalanced signal into a balanced signal. The high-pass filter or notch filter is disposed between an antenna and a first terminal of the high-frequency switch, and second and third terminals of the high-frequency switch are connected to an unbalanced terminal of the transmitter-side balun, and an unbalanced terminal of the receiver-side balun, respectively. The high-frequency module further includes a multilayer substrate preferably formed by laminating a plurality of dielectric layers together.

The multilayer substrate of this preferred embodiment may contain all the components that define the high-pass filter or notch filter, the transmitter-side balun, and the receiver-side balun, and some of the components defining the high-frequency switch, and may have the remainder of the components defining the high-frequency switch mounted thereon.

In another preferred embodiment of the present invention, a radio device includes any of the high-frequency modules according to the above-described preferred embodiments.

Accordingly, a high-frequency module according to various preferred embodiments of the present invention includes a high-pass filter or a notch filter as a high-frequency filter for attenuating spurious high-frequency signal, thus reducing the insertion loss at the high-frequency filter.

A radio device according to another preferred embodiment of the present invention includes a high-frequency module with reduced insertion loss, thereby reducing the insertion loss at the radio device.

Other features, elements, characteristics and advantages of preferred embodiments of the present invention will become more apparent from the detailed description of the preferred embodiments with reference to the attached drawings.

BRIEF DESCRIPTION OF THE DRAWINGS

Preferred embodiments of the present invention will be described with reference to the accompanying drawings in which.

DETAILED DESCRIPTION OF PREFERRED EMBODIMENTS

Figure 1:
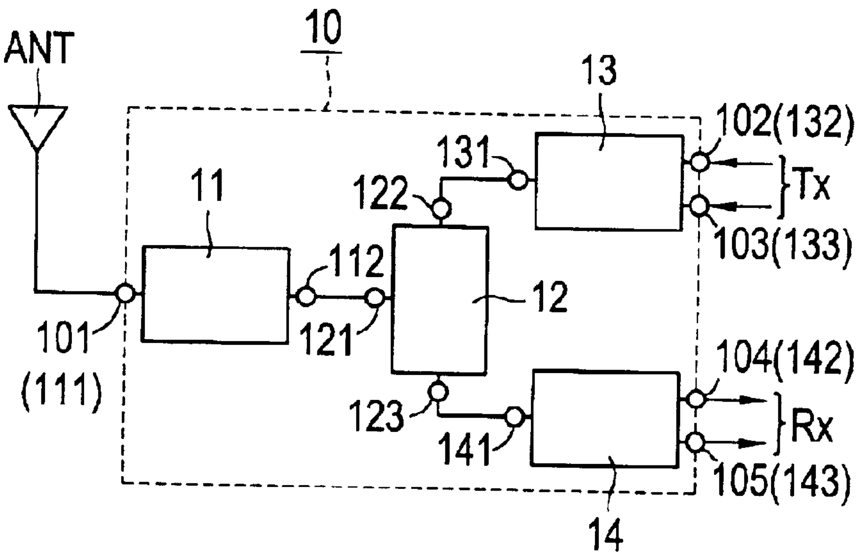
FIG. 1 is a block diagram of a high-frequency module according to a first preferred embodiment of the present invention.

FIG. 1 shows a high-frequency module 10 according to a first preferred embodiment of the present invention. The high-frequency module 10 preferably includes first to fifth terminals 101 to 105, a high-pass filter 11, a high-frequency switch 12, a transmitter-side balun 13, and a receiver-side balun 14.

The high-pass filter 11 attenuates spurious high-frequency signal such as transmission and reception signals of other frequency band communication systems represented by GSM in the 900 MHz band, DCS in the 1.8 GHz band, and PCS in the 1.9 GHz band.

The high-frequency switch 12 switches a transmission signal and a reception signal, and attenuates the third harmonic of reception signal of the 2.4 GHz communication system of preferred embodiments of the present invention.

The transmitter-side balun 13 converts a balanced signal into an unbalanced signal. The receiver-side balun 14 converts an unbalanced signal into a balanced signal, and attenuates the second harmonic of the reception signal of the communication system of preferred embodiments the present invention.

A first terminal 111 of the high-pass filter 11, which corresponds to the first terminal 101 of the high-frequency module 10, is connected to an antenna ANT. A second terminal 112 of the high-pass filter 11 is connected to a first terminal 121 of the high-frequency switch 12.

A second terminal 122 and a third terminal 123 of the high-frequency switch 12 are connected to an unbalanced terminal 131 of the transmitter-side balun 13 and an unbalanced terminal 141 of the receiver-side balun 14, respectively.

Balanced terminals 132 and 133 of the transmitter-side balun 13, which respectively correspond to the second and third terminals 102 and 103 of the high-frequency module 10, are connected to the transmitter circuit Tx. Balanced terminals 142 and 143 of the receiver-side balun 14, which respectively correspond to the fourth and fifth terminals 104 and 105 of the high-frequency module 10, are connected to the receiver circuit Rx.

Figure 2:
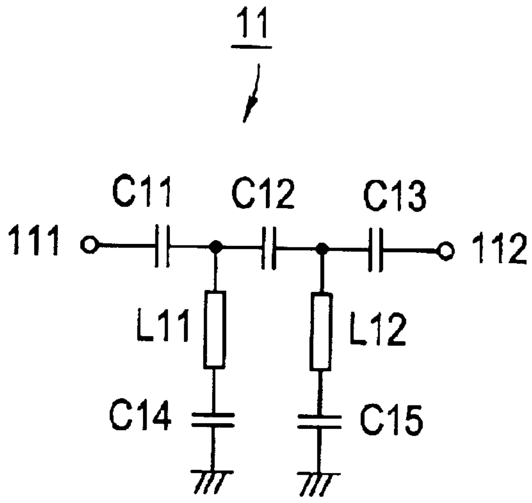
FIG. 2 is a circuit diagram of a high-pass filter in the high-frequency module shown in FIG. 1.

FIG. 2 is a circuit diagram of the high-pass filter 11 in the high-frequency module 10 shown in FIG. 1.

The high-pass filter 11 includes inductors L11 and L12, and capacitors C11 to C15. The capacitors C11 to C13 are connected in series between the first terminal 111 and the second terminal 112. The junction of the capacitors C11 and C12 is grounded through the inductor L11 and the capacitor C14, and the junction of the capacitors C12 and C13 is grounded through the inductor L12 and the capacitor C15.

Figure 3:
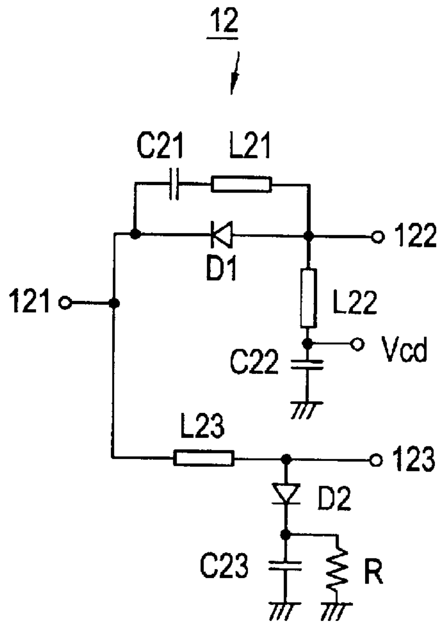
FIG. 3 is a circuit diagram of a high-frequency switch in the high-frequency module shown in FIG. 1.

FIG. 3 is a circuit diagram of the high-frequency switch 12 in the high-frequency module 10 shown in FIG. 1.

The high-frequency switch 12 preferably includes diodes D1 and D2, inductors L21 to L23, capacitors C21 to C23, and resistor R. The inductor L21 is a parallel trap coil, and the inductor L22 is a choke coil.

The diode D1 is connected between the first terminal 121 and the second terminal 122 with the cathode being directed to the first terminal 121. A serial circuit of the inductor L21 and the capacitor C21 is connected in parallel to the diode D1.

The anode of the diode D1, which is connected to the second terminal 122, is grounded through the inductor L22 and the capacitor C22, and a control terminal Vc is connected to a node between the inductor L22 and the capacitor C22.

The inductor L23 is connected between the first terminal 121 and the third terminal 123, and a node between the inductor L23 and the third terminal 123 is grounded through the diode D2 and the capacitor C23. The junction of the cathode of the diode D2 and the capacitor C23 is grounded through the resistor R.

Figure 4A:
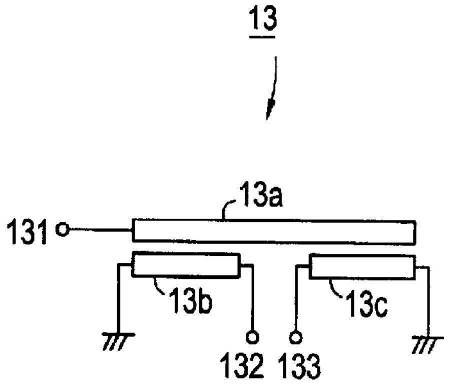
FIGS. 4A and 4B are circuit diagrams of a receiver-side balun and a transmitter-side balun, respectively, in the high-frequency module shown in FIG. 1.
Figure 4B:
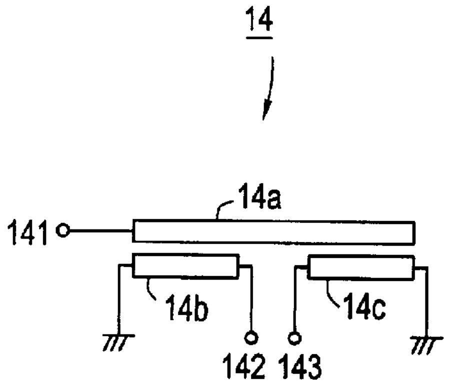

FIGS. 4A and 4B are circuit diagrams respectively showing the transmitter-side balun 13 and the receiver-side balun 14 in the high-frequency module 10 shown in FIG. 1.

As illustrated in FIGS. 4A and 4B, since the transmitter-side balun 13 and the receiver-side balun 14 preferably have the same circuit structure, a description of the receiver-side balun 14 is omitted to avoid repetition. However, reference numerals corresponding to those of the transmitter-side balun 13 are provided in parentheses.

The transmitter-side balun 13 (14) has a first line 13*a* (14*a*) having one end connected to the unbalanced terminal 131 (141), a second line 13*b* (14*b*) having one end connected to the balanced terminal 132 (142), and a third line 13*c* (14*c*) having one end connected to the balanced terminal 133 (143). The other end of the first line 13*a* (14*a*) is open-end, and the other ends of the second and third lines 13*b* and 13*c* (14*b* and 14*c*) are grounded.

Figure 5:
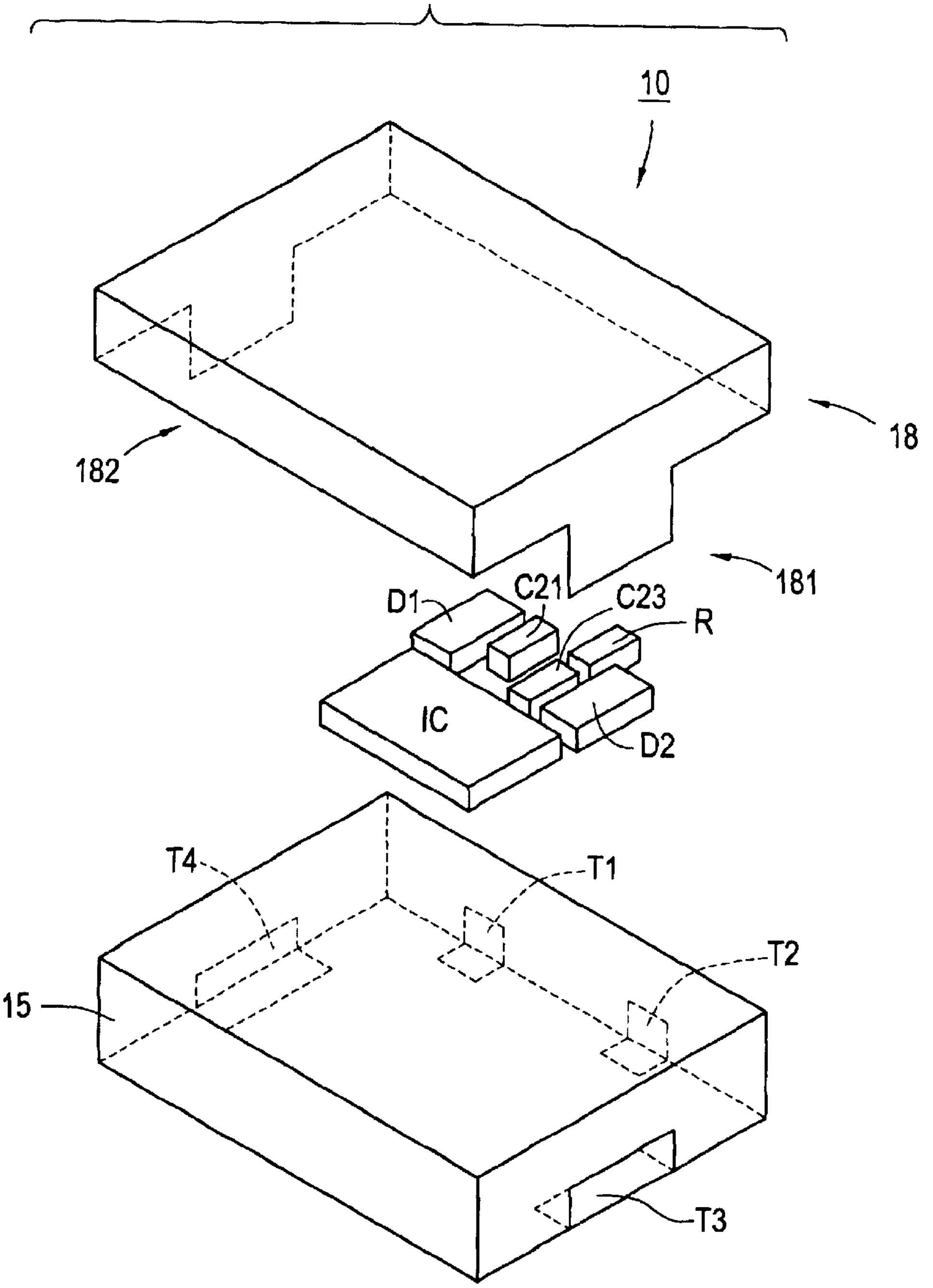
FIG. 5 is a partially exploded perspective view of the high-frequency module shown in FIG. 1.

FIG. 5 is a partially exploded perspective view of the high-frequency module 10 shown in FIG. 1. The high-frequency module 10 includes a multilayer substrate 15. The multilayer substrate 15 preferably includes the inductors L11 and L12, and the capacitors C11 to C15 of the high-pass filter 11 (see FIG. 2); the inductors L21 to L23, and the capacitor C22 of the high-frequency switch 12 (see FIG. 3); the first to third lines 13*a* to 13*c* of the transmitter-side balun 13 (see FIG. 4A); and the first to third lines 14*a* to 14*c* of the receiver-side balun 14 (see FIG. 4B), although these components are not shown in FIG. 5.

Mounted on a surface of the multilayer substrate 15 are the diodes D1 and D2, the capacitors C21 and C23, and the resistor R of the high-frequency switch 12 (see FIG. 3), and a gallium arsenide (GaAs) integrated circuit (IC) on which the transmitter circuit Tx and the receiver circuit Rx are mounted. These components are formed into chips, and these chips are mounted on the multilayer substrate 15. The multilayer substrate 15 preferably has four external terminals T1 to T4 extending over side surfaces towards the bottom surface using a technique such as screen printing.

A metal cap 18 having short projections 181 and 182, which face each other, lies over the multilayer substrate 15 to cover the chips of the diodes D1 and D2, the capacitors C21 and C23, the resistor R, and the GaAs IC, which are mounted on the multilayer substrate 15, such that the projections 181 and 182 are placed against the external terminals T3 and T4.

The external terminals T1 and T2 correspond to the first terminal 101 of the high-frequency module 10 and the control terminal Vc of the high-frequency switch 12, respectively. The external terminals T3 and T4 define ground terminals.

Connections between the second terminal 112 of the high-pass filter 11 and the first terminal 121 of the high-frequency switch 12, between the second terminal 122 of the high-frequency switch 12 and the unbalanced terminal 131 of the transmitter-side balun 13, and between the third terminal 123 of the high-frequency switch 12 and the unbalanced terminal 141 of the receiver-side balun 14 are achieved within the multilayer substrate 15.

Also, the second to fifth terminals 102 to 105 of the high-frequency module 10 are connected to the GaAs IC incorporating the transmitter circuit Tx and the receiver circuit Rx within the multilayer substrate 15.

FIGS. 6A to 6D, and FIGS. 7A to 7D, and FIG. 8A are top plan views of a plurality of dielectric layers that define the multilayer substrate 15 of the high-frequency module 10 shown in FIG. 5. FIG. 8B is a bottom view of the dielectric layer shown in FIG. 8A.

The multilayer substrate 15 is preferably formed by laminating first to ninth dielectric layers 151 to 159 in the stated order from the top, which layers are preferably made of ceramic essentially containing barium oxide, aluminum oxide, and silica, and by firing the laminate at a firing temperature not higher than about 1,000° C.

Figure 6A:
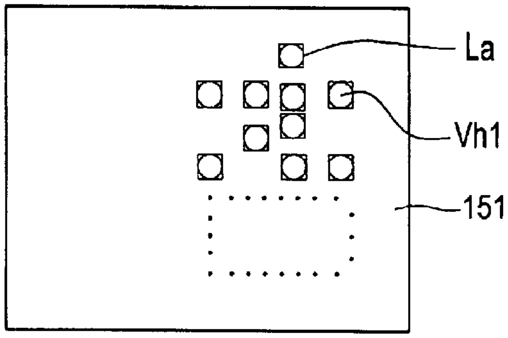
FIGS. 6A to 6D are top plan views of first to fourth dielectric layers defining a multilayer substrate of the high-frequency module shown in FIG. 5.
Figure 6B:
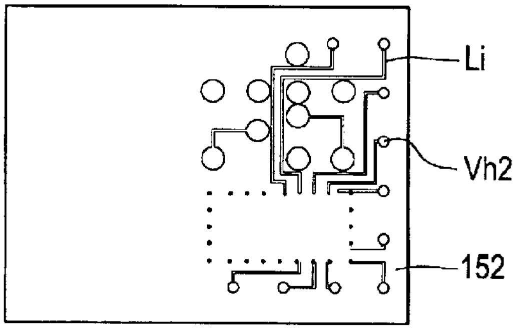

The first dielectric layer 151 shown in FIG. 6A has lands La provided on the upper surface thereof using a technique such as screen printing. The lands La preferably have the diodes D1 and D2, the capacitors C21 and C23, and the resistor R of the high-frequency switch 12, and the GaAs IC disposed thereon, and the lands La are mounted on the surface of the multilayer substrate 15. The second dielectric layer 152 shown in FIG. 6B has lines Li formed on the upper surface thereof using a technique such as screen printing or other suitable process.

Figure 6C:
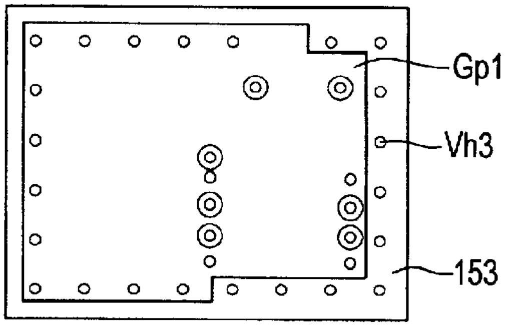
Figure 6D:
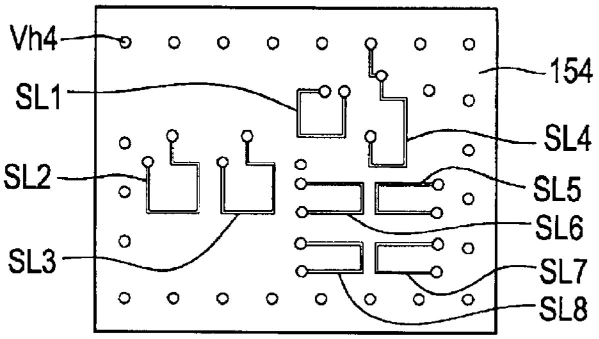
Figure 7A:
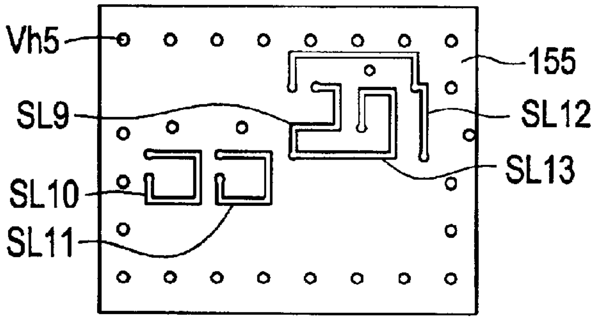
FIGS. 7A to 7D are top plan views of fifth to eighth dielectric layers defining the multilayer substrate of the high-frequency unit shown in FIG. 5.
Figure 7B:
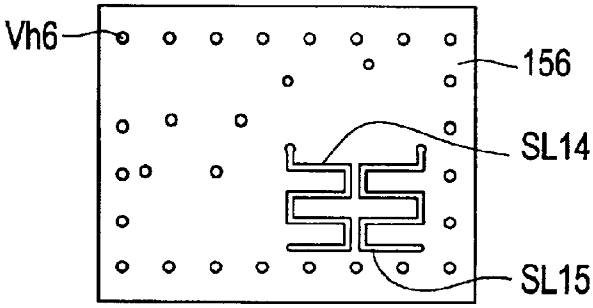
Figure 7C:
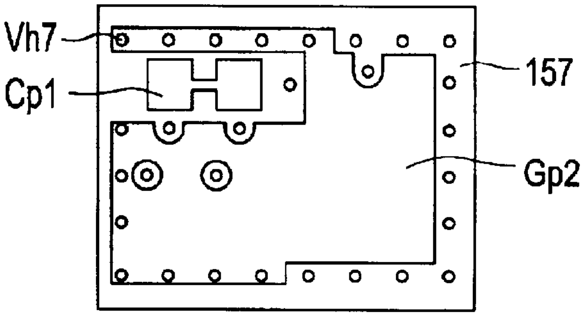
Figure 8A:
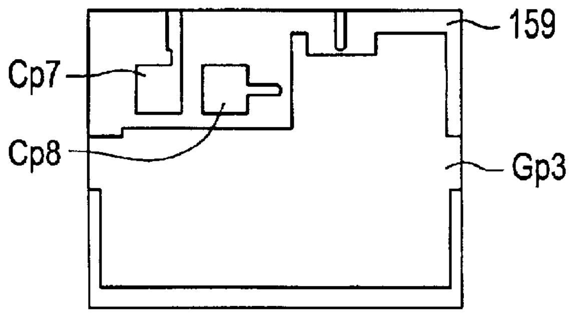
FIGS. 8A and 8B are a top plan view and a bottom view of a ninth dielectric layer defining the multilayer substrate of the high-frequency module shown in FIG. 5.
Figure 8B:
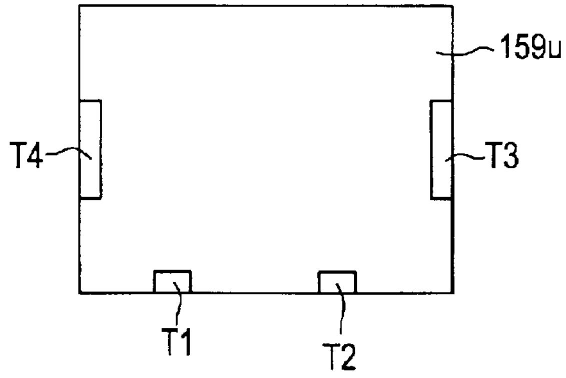

The third, seventh, and ninth dielectric layers 153, 157, and 159 shown in FIGS. 6C, 7C, and 8A have ground electrodes Gp1 to Gp3 formed on the upper surfaces thereof, respectively, using a technique such as screen printing or other suitable process. The fourth to sixth dielectric layers 154 to 156 shown in FIGS. 6D, 7A, and 7B have strip line electrodes SL1 to SL15 formed on the upper surfaces thereof, respectively, using a technique such as screen printing or other suitable process.

Figure 7D:
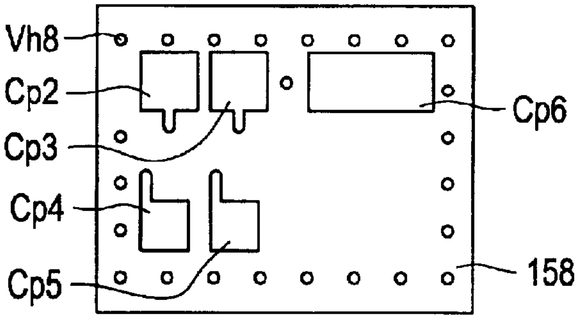

The seventh to ninth dielectric layers 157 to 159 shown in FIGS. 7C, 7D, and 8A have capacitor electrodes Cp1 to Cp8 formed on the upper surfaces thereof, respectively, using a technique such as screen printing or other suitable process. As shown in FIG. 8B, the external terminals T1 to T4 are printed and formed on the bottom surface 159*u* of the ninth dielectric layer 159 using a technique such as screen printing or other suitable process.

The strip line electrodes SL1 to SL15, the capacitor electrodes Cp1 to Cp8, and the ground electrodes Gp1 to Gp3 are preferably each defined by conductor layers.

The first to eighth dielectric layers 151 to 158 shown in FIGS. 6A to 6D and 7A to 7D have via-hole electrodes Vh1 to Vh9 arranged to connect the strip line electrodes SL1 to SL15, the capacitor electrodes Cp1 to Cp8, the ground electrodes Gp1 to Gp3, the lands La and the lines Li at predetermined positions.

In the high-pass filter 11, the inductor L11 is preferably defined by the strip line electrodes SL2 and Sl10, and the inductor L12 is preferably defined by the strip line electrodes SL3 and SL11. The capacitor C11 is preferably defined by the capacitor electrodes Cp2 and Cp7, the capacitor C12 is preferably defined by the capacitor electrodes Cp1 to Cp3, the capacitor C13 is preferably defined by the capacitor electrodes Cp3 and Cp8, the capacitor C14 is preferably defined by the capacitor electrode Cp4 and the ground electrodes Gp2 and Gp3, and the capacitor C15 is preferably defined by the capacitor electrode Cp5 and the ground electrodes Gp2 and Gp3.

In the high-frequency switch 12, the inductor L21 is preferably defined by the strip line electrodes SL1 and SL9, the inductor L22 is preferably defined by the strip line electrodes SL4 and SL13, and the inductor L23 is preferably defined by the strip line electrode SL12. The capacitor C22 of the high-frequency switch 12 is preferably defined by the capacitor electrode Cp6 and the ground electrodes Gp2 and Gp3.

The first, second, and third lines 13*a*, 13*b*, and 13*c* of the transmitter-side balun 13 are preferably defined by the strip line electrodes SL14, SL6, and SL8, respectively.

The first, second, and third lines 14*a*, 14*b*, and 14*c* of the receiver-side balun 14 are preferably defined by the strip line electrodes SL15, SL5, and SL7, respectively.

According to the first preferred embodiment, the high-frequency module 10 includes the high-pass filter 11 which functions as a high-frequency filter for attenuating spurious high-frequency signals. This prevents degradation of insertion loss at the high-frequency filter. This further makes it possible to provide a high-frequency module having high performance for transmission/reception, thus improving the performance for transmission/reception in a radio device.

Since the high-frequency switch 12 attenuates the third harmonic of the reception signal, the high-pass filter 11 and the high-frequency switch 12 may be used to effectively and sufficiently attenuate the spurious high-frequency signal. This provides a high-frequency module having higher performance for transmission/reception.

Since the receiver-side balun 13 attenuates the second harmonic of the reception signal, the high-pass filter 11 and the receiver-side balun 13 may be used to sufficiently attenuate the spurious high-frequency signal. This provides a high-frequency module having higher performance for transmission/reception.

Since the high-frequency module 10 includes the multilayer substrate 15 defined by laminating a plurality of dielectric layers, connections of the high-pass filter 11, the high-frequency switch 12, the receiver-side balun 13, and the transmitter-side balun 14 are achieved within the multilayer substrate 15. This reduces the losses due to the respective connections, thus reducing the overall losses of the high-frequency module 10.

The multilayer substrate 15 preferably formed by laminating a plurality of dielectric layers preferably includes all of the components that define the high-pass filter 11, the receiver-side balun 13, and the transmitter-side balun 14, and some of the components that define the high-frequency switch 12, and also has the remainder of the components mounted thereon. This facilitates matching between the high-pass filter 11 and the high-frequency switch 12, between the high-frequency switch 12 and the receiver-side balun 13, and between the high-frequency switches 12 and the transmitter-side balun 13. Thus, no matching circuit is required to provide matching therebetween. This results in a compact high-frequency module.

Figure 9:
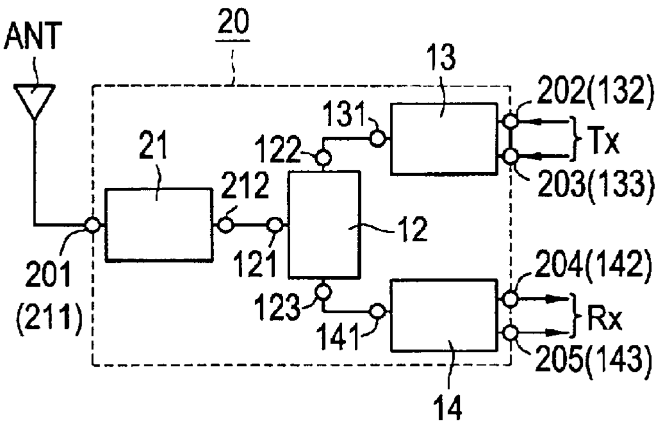
FIG. 9 is a block diagram of a high-frequency module according to a second preferred embodiment of the present invention.

FIG. 9 shows a high-frequency module 20 according to a second preferred embodiment of the present invention. The high-frequency module 20 includes first to fifth terminals 201 to 205, a notch filter 21, a high-frequency switch 12, a transmitter-side balun 13, and a receiver-side balun 14.

The notch filter 21 attenuates spurious high-frequency signals such as transmission and reception signal of other frequency band communication systems represented by GSM in the 900 MHz band, DCS in the 1.8 GHz band, and PCS in the 1.9 GHz band.

The high-frequency switch 12, the transmitter-side balun 13, and the receiver-side balun 14 have the same functions as those in the high-frequency module 10 according to the first preferred embodiment shown in FIG. 1.

A first terminal 211 of the notch filter 21, which corresponds to the first terminal 201 of the high-frequency module 20, is connected to an antenna ANT. A second terminal 212 of the notch filter 21 is connected to a first terminal 121 of the high-frequency switch 12.

A second terminal 122 and a third terminal 123 of the high-frequency switch 12 are connected to an unbalanced terminal 131 of the transmitter-side balun 13 and an unbalanced terminal 141 of the receiver-side balun 14, respectively.

Balanced terminals 132 and 133 of the transmitter-side balun 13, which respectively correspond to the second and third terminals 202 and 203 of the high-frequency module 20, are connected to the transmitter circuit Tx. Balanced terminals 142 and 143 of the receiver-side balun 14, which respectively correspond to the fourth and fifth terminals 204 and 205 of the high-frequency module 20, are connected to the receiver circuit Rx.

Figure 10:
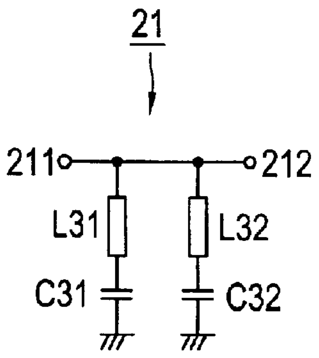
FIG. 10 is a circuit diagram of a notch filter in the high-frequency module shown in FIG. 9.

FIG. 10 is a circuit diagram of the notch filter 21 in the high-frequency module 20 shown in FIG. 9.

The notch filter 21 preferably includes inductors L31 and L32, and capacitors C31 and C32. A serial circuit of the inductor L31 and the capacitor C31, and a serial circuit of the inductor L32 and the capacitor C32 are connected in parallel between the first terminal 211 and the second terminal 222.

According to the second preferred embodiment, the high-frequency module 20 includes the notch filter 21 that functions as a high-frequency filter for attenuating the spurious high-frequency signal. This prevents the characteristic of insertion loss at the high-frequency filter from being degraded. This further makes it possible to provide a high-frequency module having high performance for transmission/reception, thus improving the performance for transmission/reception in a radio device.

The vicinity of higher harmonics, which are desired to be attenuated, is only attenuated, thus reducing the influence on the fundamental pass band. Therefore, the overall losses of the high-frequency module are greatly reduced.

Figure 11:
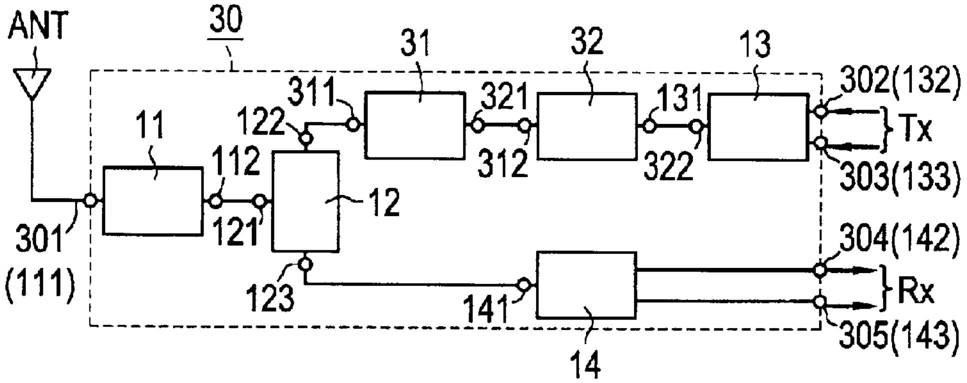
FIG. 11 is a block diagram of a high-frequency module according to a third preferred embodiment of the present invention.

FIG. 11 shows a high-frequency module 30 according to a third preferred embodiment of the present invention. The high-frequency module 30 preferably includes first to fifth terminals 301 to 305, a high-pass filter 11, a high-frequency switch 12, a transmitter-side balun 13, a receiver-side balun 14, a low-pass filter 31, and a high-power amplifier 32.

The low-pass filter 31 attenuates noise caused by the high-power amplifier 32, which is a spurious high-frequency signal, such as harmonics of transmission signal of the 2.4 GHz communication system of preferred embodiments of the present invention. The high-power amplifier 32 amplifies the transmission signal of that communication system.

The high-pass filter 11, the high-frequency switch 12, the transmitter-side balun 13, and the receiver-side balun 14 preferably have the same functions as those in the high-frequency module 10 according to the first preferred embodiment shown in FIG. 1.

A first terminal 111 of the high-pass filter 11, which corresponds to the first terminal 301 of the high-frequency module 30, is connected to an antenna ANT. A second terminal 112 of the high-pass filter 11 is connected to a first terminal 121 of the high-frequency switch 12.

A second terminal 122 and a third terminal 123 of the high-frequency switch 12 are connected to a first terminal 311 of the low-pass filter 31, and an unbalanced terminal 141 of the receiver-side balun 14, respectively.

A second terminal 312 of the low-pass filter 31 is connected to a first terminal 321 of the high-power amplifier 32, and a third terminal 322 of the high-power amplifier 32 is connected to an unbalanced terminal 131 of the transmitter-side balun 13.

Balanced terminals 132 and 133 of the transmitter-side balun 13, which respectively correspond to the second and third terminal 302 and 303 of the high-frequency module 30, are connected to the transmitter circuit Tx. Balanced terminals 142 and 143 of the receiver-side balun 14, which respectively correspond to the fourth and fifth terminals 204 and 205 of the high-frequency module 20, are connected to the receiver circuit Rx.

Figure 12:
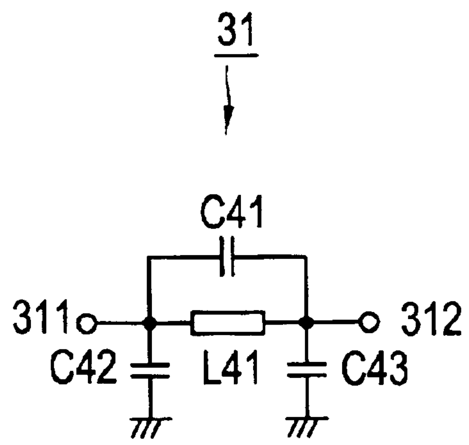
FIG. 12 is a circuit diagram of a low-pass filter in the high-frequency module shown in FIG. 11.
Figure 13:
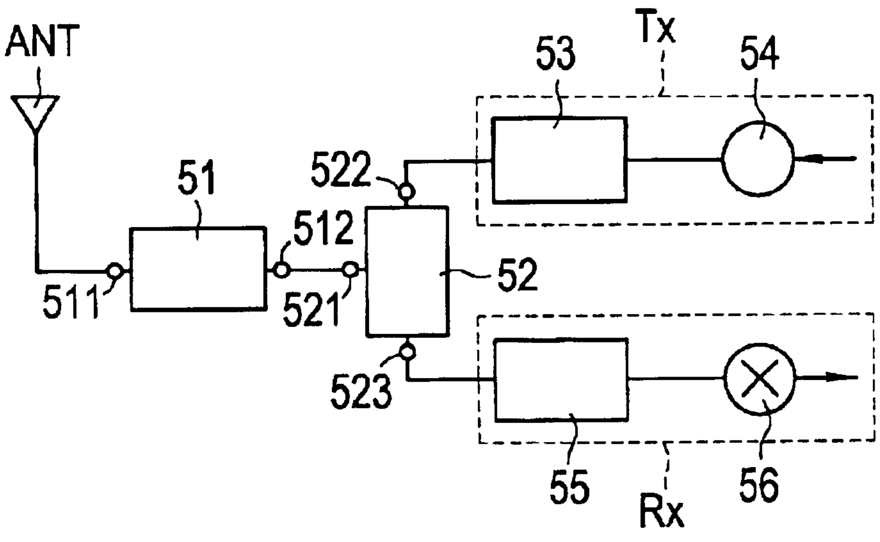
FIG. 13 is a block diagram of a typical RF circuit for Bluetooth protocol.

FIG. 12 is a circuit diagram of the low-pass filter 31 in the high-frequency module 30 shown in FIG. 11.

The low-pass filter 31 includes an inductor L41, and capacitors C41 to C43. A parallel circuit of the inductor L41 and the capacitor C41 is connected between the first terminal 311 and the second terminal 312, and the ends of the parallel circuit are connected to the ground through the capacitors C42 and C43, respectively.

According to the third preferred embodiment, the high-frequency module 30 includes the high-pass filter 11 and the low-pass filter 31 to eliminate noise caused by the high-power amplifier 32 that is used to amplify the power of the transmission signal. This provides a radio device with greatly improved performance for transmission, which requires a high-power transmission signal.

In the preferred embodiments, a multilayer substrate contains all of the components that define a high-pass filter or notch filter, a receiver-side balun, and a transmitter-side balun, and some of the components that define a high-frequency switch, and also has the remainder of the components that define the high-frequency switch mounted thereon. However, the present invention is not limited to this structure. The high-frequency module may also be designed so that a multilayer substrate containing all the components that define a high-pass filter or notch filter, a receiver-side balun, and a transmitter-side balun, and some of the components that define a high-frequency switch, and the remainder of the components that define the high-frequency switch are mounted on the same printed board.

In the third preferred embodiment, a low-pass filter and a high-power amplifier are preferably disposed between a high-frequency switch and a transmitter-side balun. However, a notch filter and a high-power amplifier may also be disposed therebetween. In this case, the notch filter may be used to attenuate only the vicinity of noise caused by the high-power amplifier, which is desired to be attenuated, thus reducing the influence on the fundamental pass band. Therefore, the insertion loss at the fundamental pass band is reduced to reduce the overall losses of the high-frequency module.

Although the present invention has been described through illustration of its preferred embodiments, it is to be understood that the preferred embodiments are only illustrative and that various changes and modifications may be made thereto without departing from the scope of the present invention which is limited solely by the appended claims.

What is claimed is:

1. A high-frequency module comprising:

a high-frequency filter arranged to attenuate a spurious high-frequency signal;

a high-frequency switch arranged to switch a transmission signal and a reception signals, wherein the high-frequency switch attenuates the third harmonic of the reception signal;

a transmitter-side balun arranged to convert a balanced signal into an unbalanced signal; and a receiver-side balun arranged to convert an unbalanced signal into a balanced signal, wherein the receiver-side balun attenuates the second harmonic of the reception signal;

wherein said high-frequency filter is disposed between an antenna and a first terminal of said high-frequency switch, a second terminal of said high-frequency switch is connected to an unbalanced terminal of said transmitter-side balun, a third terminal of said high-frequency switch is connected to an unbalanced terminal of said receiver-side balun, and said high-frequency filter is a high-pass filter or a notch filter.

2. A high-frequency module according to claim 1, wherein the high-pass filter attenuates transmission and reception signals of GSM in the 900 MHz band, DCS in the 1.8 GHz band, and PCS in the 1.9 GHz band.

3. A high-frequency module according to claim 1, the high-frequency switch attenuates the third harmonic of reception signal of a 2.4 GHz communication system.

4. A high-frequency module according to claim 1, wherein the high-pass filter includes at least one inductor and at least one capacitor.

5. A high-frequency module according to claim 1, wherein the high-frequency switch includes at least one diode, at least one inductor, at least one capacitor, and at least one resistor.

6. A high-frequency module according to claim 1, further comprising a multilayer substrate including a laminated body having a plurality of dielectric layers, wherein the electrical connections between the second terminal of the high-pass filter and the first terminal of the high-frequency switch, between the second terminal of the high-frequency switch and the unbalanced terminal of the transmitter-side balun, and between the third terminal of the high-frequency switch and the unbalanced terminal of the receiver-side balun are achieved within the multilayer substrate.

7. A high-frequency module comprising:

one of a high-pass filter and a notch filter arranged to attenuate spurious high-frequency signal;

a high-frequency switch arranged to switch a transmission signal and a reception signal, wherein the high-frequency switch attenuates the third harmonic of the reception signal;

a transmitter-side balun arranged to convert a balanced signal into an unbalanced signal; and a receiver-side balun arranged to convert an unbalanced signal into a balanced signal, wherein the receiver-side balun attenuates the second harmonic of the reception signal;

wherein said one of the high-pass filter and the notch filter is disposed between an antenna and a first terminal of said high-frequency switch, a second terminal of said high-frequency switch is connected to an unbalanced terminal of said transmitter-side balun, a third terminal of said high-frequency switch is connected to an unbalanced terminal of said receiver-side balun, and said high-frequency module further comprises a multilayer substrate including a laminated body having a plurality of dielectric layers.

8. A high-frequency module according to claim 7, wherein said multilayer substrate contains all of the components that define said one of the high-pass filter and the notch filter, said transmitter-side balun, and said receiver-side balun, and some of the components that define said high-frequency switch, and said multilayer substrate has the remainder of the components that define said high-frequency switch mounted thereon.

9. A high-frequency module according to claim 7, wherein the high-pass filter attenuates transmission and reception signals of GSM in the 900 MHz band, DCS in the 1.8 GHz band, and PCS in the 1.9 GHz band.

10. A high-frequency module according to claim 7, the high-frequency switch attenuates the third harmonic of reception signal of a 2.4 GHz communication system.

11. A high-frequency module according to claim 7, wherein the high-pass filter includes at least one inductor and at least one capacitor.

12. A high-frequency module according to claim 7, wherein the high-frequency switch includes at least one diode, at least one inductor, at least one capacitor, and at least one resistor.

13. A high-frequency module according to claim 7, wherein the electrical connections between the second terminal of the high-pass filter and the first terminal of the high-frequency switch, between the second terminal of the high-frequency switch and the unbalanced terminal of the transmitter-side balun, and between the third terminal of the high-frequency switch and the unbalanced terminal of the receiver-side balun are achieved within the multilayer substrate.

14. A radio device including a high-frequency module according to claim 1.

15. A radio device including a high-frequency module according to claim 7.

* * * * *